United States Patent
Mrdeza et al.

(10) Patent No.: US 7,438,306 B2
(45) Date of Patent: Oct. 21, 2008

(54) MOTORCYCLE RAKE AND TRAIL ADJUSTER

(76) Inventors: Matthew Mrdeza, 14005 N. Warbonnet La., Prescott, AZ (US) 86305; Joseph Gschweng, 7912 E. Lost Horse Cir., Prescott Valley, AZ (US) 86314

( * ) Notice: Subject to any disclaimer, the term of this patent is extended or adjusted under 35 U.S.C. 154(b) by 238 days.

(21) Appl. No.: 11/588,753

(22) Filed: Oct. 27, 2006

(65) Prior Publication Data
US 2008/0100028 A1 May 1, 2008

(51) Int. Cl.
B62K 21/00 (2006.01)
(52) U.S. Cl. ............... 280/279; 280/274; 280/276; 280/278; 280/280; 280/287
(58) Field of Classification Search ........... 280/280, 280/279, 276, 274, 278, 287
See application file for complete search history.

(56) References Cited

U.S. PATENT DOCUMENTS

| | | | |
|---|---|---|---|
| 3,298,713 A | | 1/1967 | Plain |
| 3,556,557 A | | 1/1971 | Blair, III |
| 3,822,755 A | * | 7/1974 | Hine ................ 180/185 |
| 3,866,946 A | * | 2/1975 | Robison ............ 280/279 |
| 4,012,055 A | * | 3/1977 | Ottow .............. 280/276 |
| 4,565,384 A | * | 1/1986 | Dehnisch .......... 280/279 |
| 4,600,207 A | | 7/1986 | Zosi |
| 4,624,470 A | | 11/1986 | Love |
| 4,700,963 A | | 10/1987 | Burns et al. |
| 5,782,313 A | | 7/1998 | Kurawaki et al. |
| 5,967,538 A | * | 10/1999 | Callaluca et al. ......... 280/279 |
| 6,926,297 B2 | | 8/2005 | Czysz |
| 7,111,861 B2 | * | 9/2006 | Pender ............... 280/279 |
| 2005/0127636 A1 | * | 6/2005 | Czysz ............... 280/276 |
| 2005/0212251 A1 | * | 9/2005 | Czysz ............... 280/276 |
| 2006/0060405 A1 | | 3/2006 | Pender |

FOREIGN PATENT DOCUMENTS

DE P32 23 728.6 A1 6/1982
JP 406159423 A 6/1994

* cited by examiner

Primary Examiner—Joanne Silbermann
Assistant Examiner—Tashiana Adams
(74) Attorney, Agent, or Firm—Kenneth L. Green; Edgar W. Averill, Jr.

(57) ABSTRACT

A motorcycle fork rake extension kit provides an increased fork rake without welding and maintains a favorable trail. The extension kit includes an upper adapter block fixedly attached to an upper end of a steering head of a motorcycle frame and a lower adapter block fixedly attached to a lower end of the steering head of the motorcycle frame. Triple trees are rotatably attached to triple tree ends of the adapter blocks through steering head bearings. The triple tree ends of the adapter blocks are spaced away from the frame, the lower adapter block having a greater spacing to increase fork rake. The lower triple tree may further space the fork tubes forward to further increase fork rake. In a preferred embodiment, approximately 45 degrees of rake is provided with favorable trail.

13 Claims, 7 Drawing Sheets

MOTORCYCLE RAKE AND TRAIL ADJUSTER

BACKGROUND OF THE INVENTION

The present invention relates to custom motorcycles and in particular to apparatus for adjusting the rake and trail of motorcycle forks.

Custom motorcycle riders and builders often extend the fork angle (or rake) to obtain a desired look or a desired motorcycle feel. Various methods may be employed to extend the fork angle, ranging from permanent modifications to the motorcycle frame by modifying the angle of the steering head, to an adjustable bolt-on kit.

Most rake extension kits retain the original axis of rotation of the forks and angularly offset the forks with respect to the steering head of the frame. Such kits are disclosed in U.S. Pat. No. 5,967,538 for "ADJUSTABLE MOTORCYCLE TRIPLE TREE" and U.S. Pat. No. 4,565,384 for "MOTORCYCLE FORK TREE." While these kits allow adjustment of the fork rake, they also undesirably alter the trail (see FIG. 3A.) Such alteration of the trail often results in a less desirable and potentially unsafe motorcycle feel and/or handling.

Another rake adjustment kit is described in U.S. Pat. No. 3,866,946 for "MOTORCYCLE STEERING HEAD ANGLE ADJUSTMENT." The kit disclosed in the '946 patent includes eccentrics in the steering head to adjust the fork rake, and as a result is severely limited in the amount of adjustment.

BRIEF SUMMARY OF THE INVENTION

The present invention addresses the above and other needs by providing a motorcycle fork rake extension kit which provides an increased fork rake without welding and maintains a favorable trail. The extension kit includes an upper adapter block fixedly attached to an upper end of a steering head of a motorcycle frame and a lower adapter block fixedly attached to a lower end of the steering head of the motorcycle frame. Triple trees are rotatably attached to triple tree ends of the adapter blocks through steering head bearings. The triple tree ends of the adapter blocks are spaced away from the frame, the lower adapter block having a greater spacing to increase fork rake. The lower triple tree may further space the fork tubes forward to further increase fork rake. In a preferred embodiment, approximately 45 degrees of rake is provided with favorable trail.

In accordance with one aspect of the invention, there is provided a motorcycle fork rake extender including an upper adapter block and a lower adapter block. The upper adapter block has an upper frame end and an upper triple clamp end, which upper frame end is spaced apart from the upper triple clamp end by an upper adapter spacing. The lower adapter block has a lower frame end and a lower triple clamp end, which lower frame end is spaced apart from the lower triple clamp end by a lower adapter spacing, wherein the lower adapter spacing is greater than the upper adapter spacing. The upper frame end of the upper adapter block is fixedly attached to the upper end of a frame steering head and the lower frame end of the lower adapter block is fixedly attached to the lower end of a frame steering head. The upper fork end of the upper adapter block includes a seat for an upper fork bearing and the lower fork end of the lower adapter block includes a seat for a lower fork bearing. An upper triple clamp is rotatably connected to the upper adapter block through the fork bearings and a lower triple clamp rotatably connected to the lower adapter block through the fork bearings.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1:
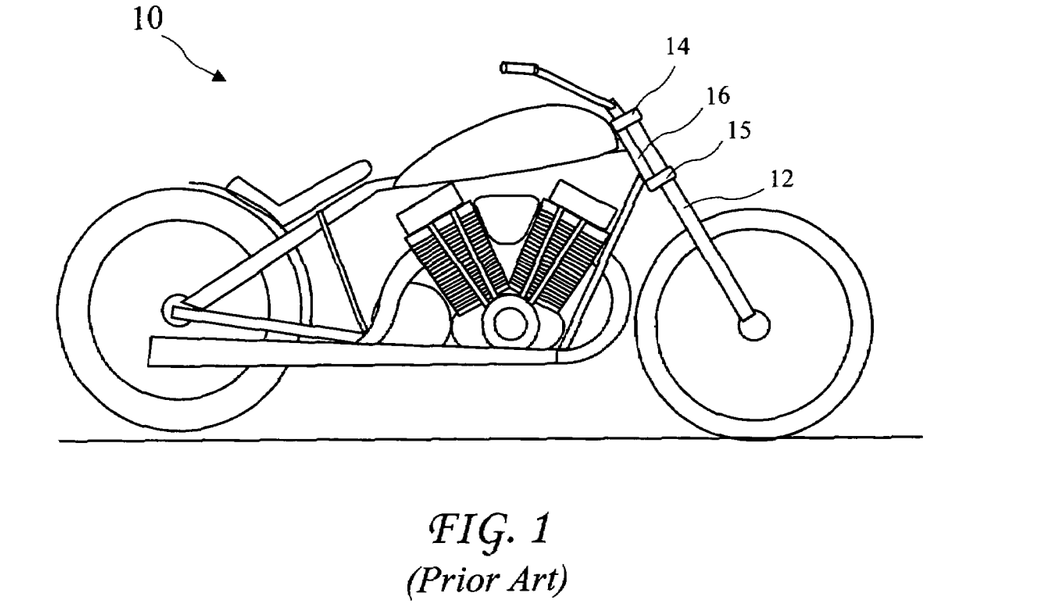
FIG. 1 is a prior art motorcycle with a stock rake.

A prior art motorcycle 10 with a stock (or original) fork rake is shown in FIG. 1. The prior art motorcycle 10 includes forks 12 mounted to a steering head 16 by original triple trees 14 and 15. Custom motorcycle riders often desire to increase the fork 12 rake to obtain a more custom appearance. Generally, significantly increasing the fork rake requires significant modifications to the motorcycle frame to alter the steering head angle, at significant expense and time. While small increases in rake may be achieved by using "raked triple trees" which increase rake without modification to the original steering axis, such raked triple trees adversely affect trail and is therefore limited to small rake increases due to these affects on trail.

Figure 2:
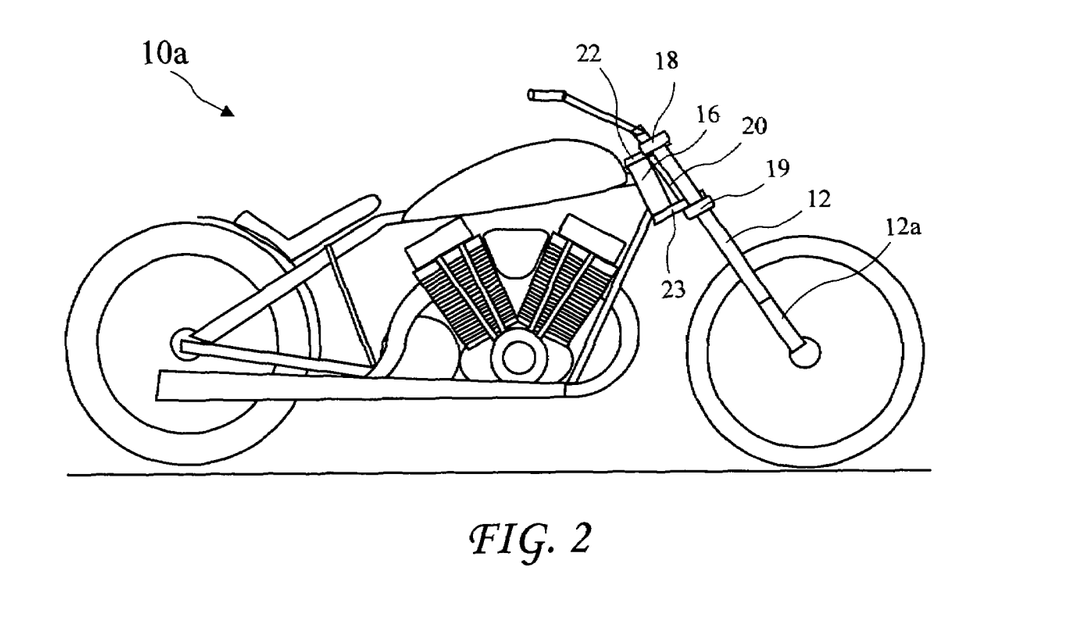
FIG. 2 is a motorcycle with a rake extension kit according to the present invention installed.

A motorcycle 10a with a rake extension kit according to the present invention installed is shown in FIG. 2. The fork rake extension kit includes an upper adapter block 22 and a lower adapter block 23 attached to the unmodified steering head 16. An upper triple tree 18 and a lower triple tree 19 connect to the adapter blocks 22 and 23, and the forks 12 attach to the triple trees 18 and 19. Fork extensions 12a are provided to maintain the original ground height of the motorcycle 10a.

Figure 3:
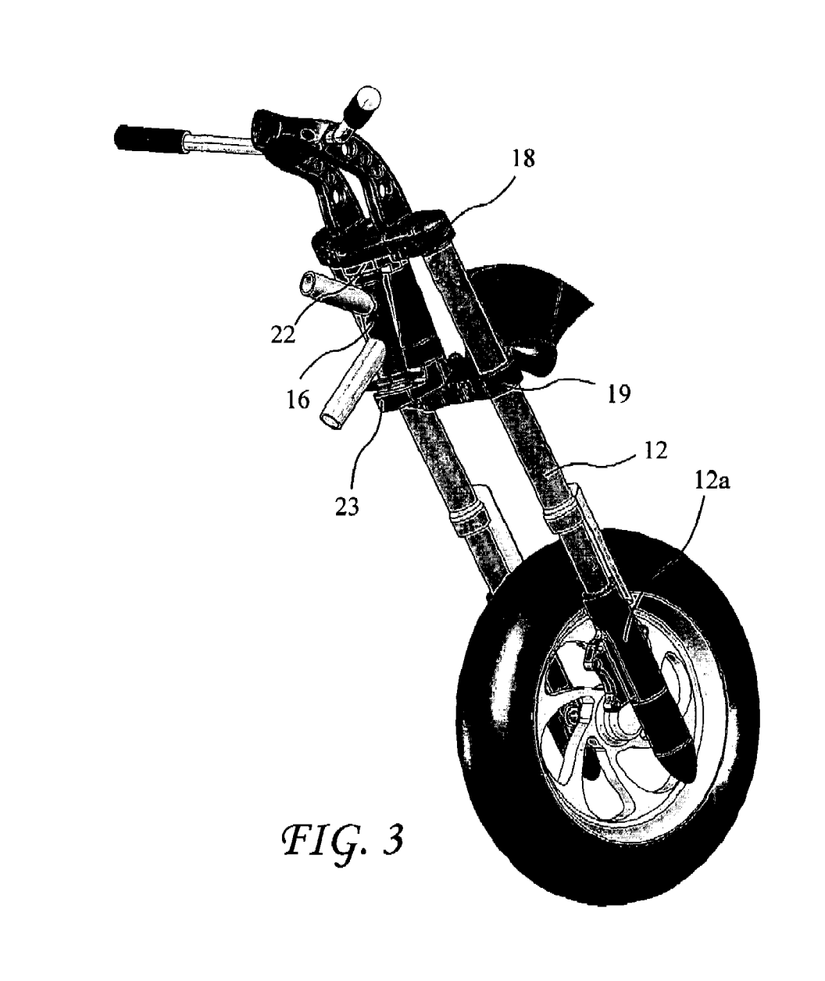
FIG. 3 shows a more detailed view of motorcycle forks with the fork rake extended using the present invention.

A more detailed view of the motorcycle forks 12 with the fork rake extended using the present invention is shown in FIG. 3. The lower adapter block 23 pushes the lower triple tree 19 forward, and the lower triple tree 19 pushes the forks 12 forward, both contributing to increased fork rake while maintaining a desired trail.

Figure 3A:
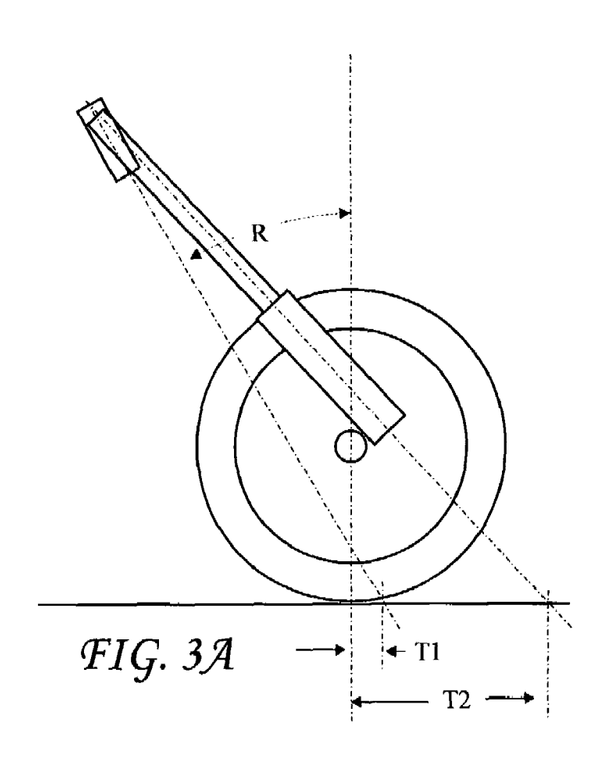
FIG. 3A is a diagram of trial and rake.

A diagram of trail and rake is shown in FIG. 3A. The combination of trail and rake is an important factor in motorcycle handling. The present invention provides some rake increase in the adapter blocks 22 and 23, and some rake increase in the triple trees 18 and 19. The result is a preferred trail T1. If the triple trees 18 and 19 did not provide some of the rake increase, a much larger and less desirable trail T2 would result, and conversely, if all of the rake increase is obtained by the triple trees, a much smaller and less desirable trail would result.

Figure 4:
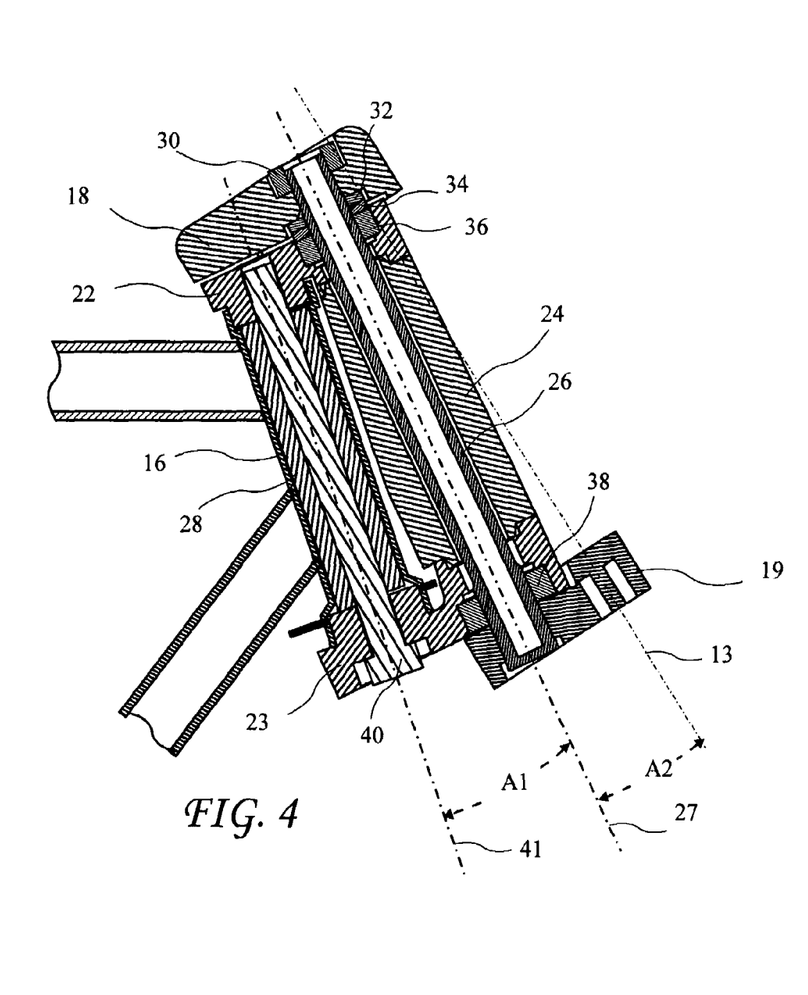
FIG. 4 is a cross-sectional view of the fork rake extender attached to a steering head.
Figure 5:
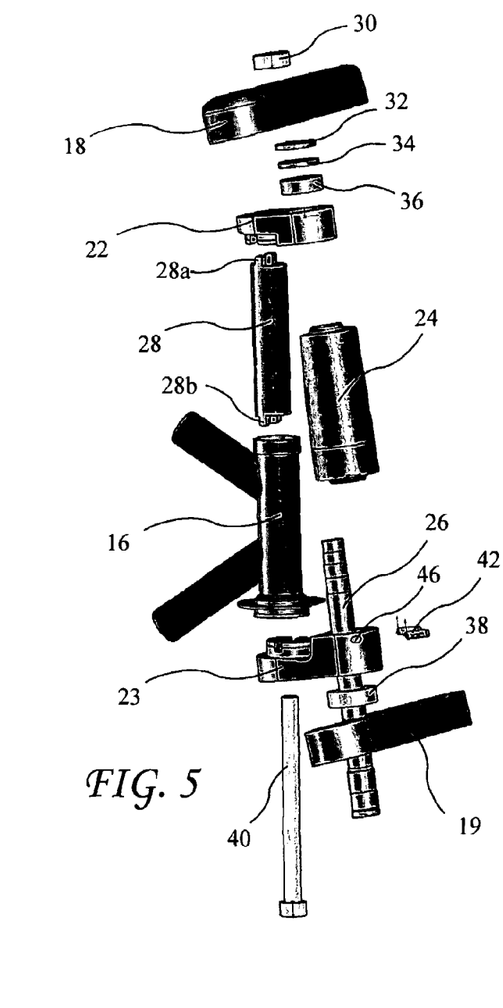
FIG. 5 is an exploded view of elements of the fork rake extender kit.

A cross-sectional view of the fork rake extender attached to the steering head 16 is shown in FIG. 4 and an exploded view of elements of the fork rake extender kit are shown in FIG. 5. A rear spacer shaft 28 resides in the unmodified steering head 16. The spacer shaft 28 includes shaft alignment features 28a and 28b at the top and bottom of the spacer shaft 28 respectively. Preferred alignment features 28a and 28b comprise a cylindrical center coaxial with the spacer shaft 28, and opposed rectangular blocks extending radially from the cylindrical center. The upper adapter block 22 resides on the top of the steering head 16, and the lower adapter block resides on the bottom of the steering head 16. Each adapter block 22 and 23 includes a cylindrical portion 43 configured to fit into bearing seats in the steering head 16. The cylindrical portions 43 further include block alignment features which are preferably rectangular notches configured to engage the shaft alignment features 28a and 28b. The upper and lower adapter blocks 22 and 23 are held to the steering head by at least one adapter block fastener, and preferably by a main assembly bolt 40 inserted though the lower adapter block 23, through the spacer 28, and threaded into the upper adapter block 22. Tightening the bolt 40 secures the upper and lower adapter blocks 22 and 23 to the steering head 16 and preferably vertically squeezes the adapter blocks 22 and 23 against steering head 16.

Continuing with FIGS. 4 and 5, upper and lower bearings 36 and 38 reside in the upper and lower adapter blocks 22 and 23 respectively. A steering shaft 26 is inserted upward through the lower triple tree 19, the bearing 38, the lower adapter block 23, a front spacer shaft 24, the upper bearing 36, and the upper adapter block 22. A lock nut 34 is threaded onto the upper end of the steering shaft 26, and a double lock nut 32 is threaded onto the upper end of the steering shaft 26 and against the nut 34. The upper triple tree 18 is then placed over the upper end of the steering shaft 26, and a triple tree retainer nut 30 is threaded onto the steering shaft 26 over the upper triple tree 18. Set screws 42 extend through the lower adapter block 23 to engage surfaces of the steering head 16 or motorcycle frame to prevent rotation of the lower adapter block 23.

The lower adapter block 23 has a lower steering head end 23a and a lower triple tree end 23b (see FIG. 6B) spaced apart by a lower adapter spacing and the upper adapter block 22 has corresponding upper steering head end and upper triple tree end spaced apart by an upper adapter spacing. The lower adapter spacing is preferably greater than the upper adapter spacing resulting in an increase in the fork rake of angle A1 between a bolt centerline 41 and steering shaft centerline 27. Further, the forks 12 have a fork centerline 13 offset from the steering shaft centerline 27 by a second angle A2. A total increase in fork rake of A1+A2 results.

Figures 6, 6B:
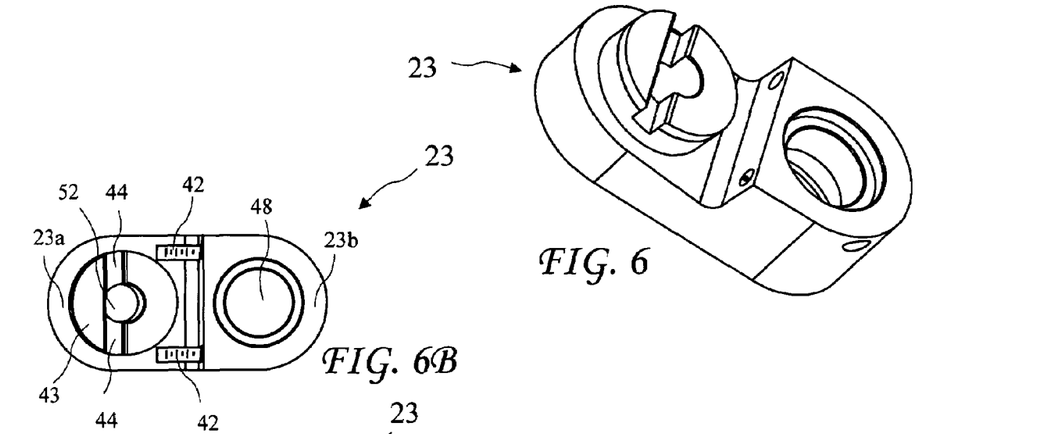
FIG. 6 is a perspective view of a lower adapter block according to the present invention of the fork rake extender kit.
FIG. 6B is a top view of the lower adapter block.
Figure 6A:
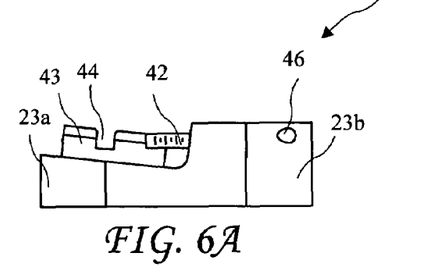
FIG. 6A is a side view of the lower adapter block.
Figure 6C:
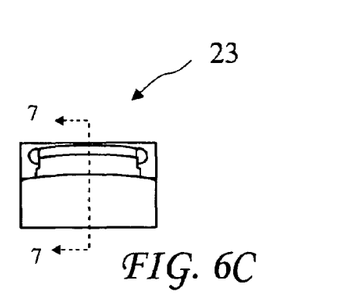
FIG. 6C is a rear view of the lower adapter block.
Figure 7:
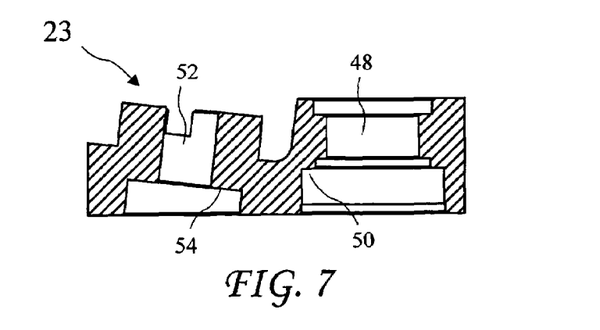
FIG. 7 is a cross-sectional view of the lower adapter block taken along line 7-7 of FIG. 6C.

A perspective view of the top and side of the lower adapter block 23 is shown in FIG. 6, a side view of the lower adapter block 23 is shown in FIG. 6A, a top view of the lower adapter block 23 is shown in FIG. 6B, and a rear view of the lower adapter block is shown in FIG. 6C. A cross-sectional view of the lower adapter 23 taken along line 7-7 of FIG. 6C is shown in FIG. 7. The lower adapter block 23 is approximately oval with the cylindrical portion 43 for cooperation with the steering head 16 bearing seats and the spacer 28 at one end, and a stepped mouth 48 for cooperation with the lower triple tree 19 and the spacer 24 at the opposite end. The cylindrical portion 43 includes a bolt passage 52 for the main assembly bolt 40 (see FIG. 4), a bolt shoulder 54 for cooperation with the bolt 40, and rectangular notches 44 for cooperation with the spacer 28 (see FIGS. 4 and 5). The stepped mouth 48 provides a passage for the steering shaft 26 and a seat 50 for the lower steering bearing 38 (see FIGS. 4 and 5). The set screws 42 are positioned to tighten against features of the steering head 16, for example the steering stop pads, or features on the motorcycle frame, and the positions of the set screws 42 may be varied for different motorcycles or motorcycle frames. The screws 42 may be used during installation for adjustment of the lower adapter block 23, or for subsequent adjustment. The screws 42 may also be tightened to aid in preventing the lower adapter block 23 from rotating during use.

Figure 8:
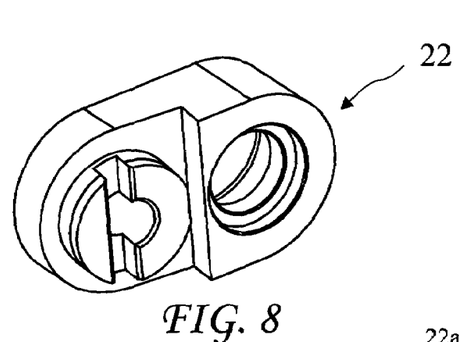
FIG. 8 is a perspective view of an upper adapter block according to the present invention of the fork rake extender kit.
Figure 8A:
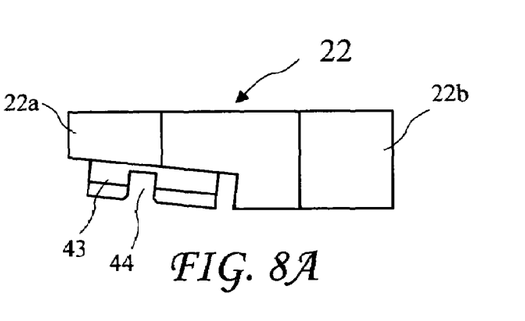
FIG. 8A is a side view of the upper adapter block.
Figure 8B:
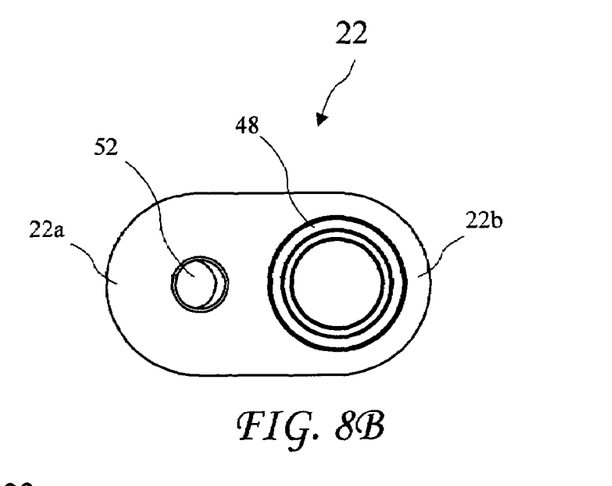
FIG. 8B is a top view of the upper adapter block.
Figure 8C:
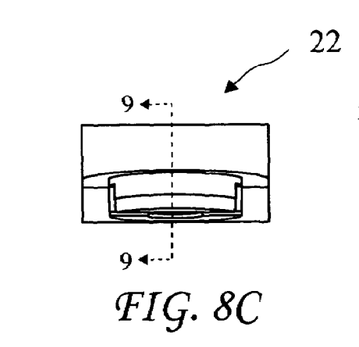
FIG. 8C is a rear view of the upper adapter block.
Figure 9:
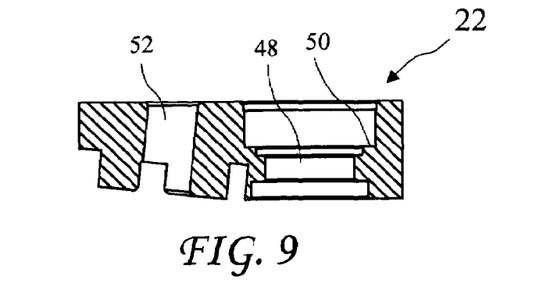
FIG. 9 is a cross-sectional view of the upper adapter block taken along line 9-9 of FIG. 8C.

A perspective view of the bottom of the upper adapter block 22 is shown in FIG. 8, a side view of the side view of the upper adapter block 22 is shown in FIG. 8A, a top view of the upper adapter block 22 is shown in FIG. 8B, and a rear view of the upper adapter block 22 is shown in FIG. 8C. A cross-sectional view of the upper adapter block 22 taken along line 9-9 of FIG. 8C is shown in FIG. 9. The upper adapter block 22 is approximately oval with the cylindrical portion 43 for cooperation with the upper bearing seat of the steering head 16 and the spacer 28 at an upper steering head end 22a, and a stepped mouth 48 for cooperation with the lower triple tree 19 and the spacer 24 at the opposite end. The cylindrical portion 43 includes a bolt passage 52 for the main assembly bolt 40 (see FIG. 4), and notches 44 for cooperation with the spacer 28 (see FIGS. 4 and 5). The stepped mouth 48 provides a passage for the steering shaft 26 and a seat 50 for the lower steering bearing 38 at the upper triple tree end 22b of the upper adaptor block 22 (see FIGS. 4 and 5).

Figures 10, 11:
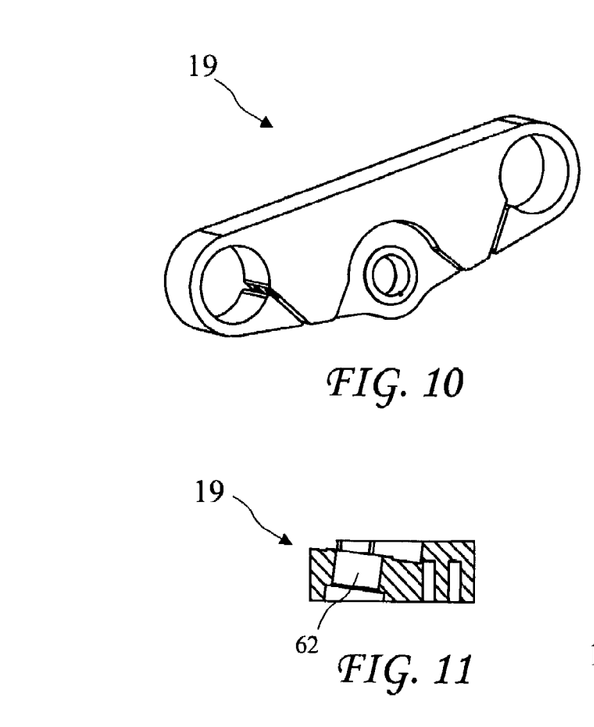
FIG. 10 is a top perspective view of a lower triple tree according to the present invention of the fork rake extender kit.
FIG. 11 is a cross-sectional view of the lower triple tree taken along line 11-11 of FIG. 10A.
Figures 10A, 10C, 10D:
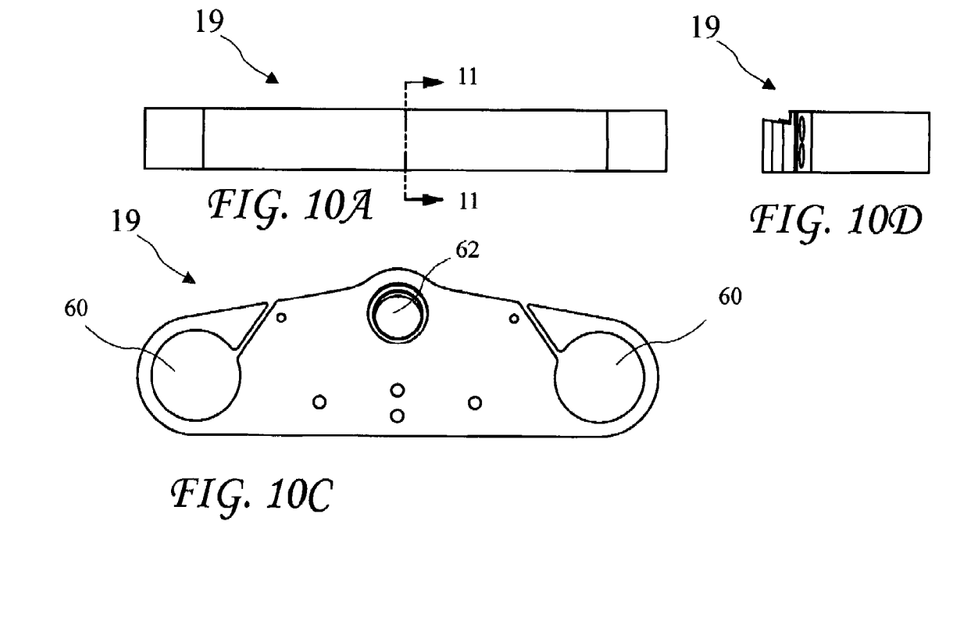
FIG. 10A is a front view of the lower triple tree.
FIG. 10C is a bottom view of the lower triple tree.
FIG. 10D is a side view of the lower triple tree.
Figure 10B:
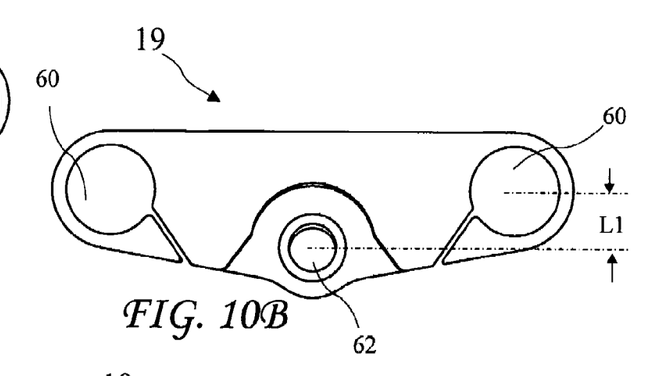
FIG. 10B is a top view of the lower triple tree.

A top perspective view of a lower triple tree 19 according to the present invention is shown in FIG. 10, a front view of the lower triple tree 19 is shown in FIG. 10A, a top view of the lower triple tree 19 is shown in FIG. 10B, a rear view of the lower triple tree 19 is shown in FIG. 10C, and a side view of the lower triple tree 19 is shown in FIG. 10D. A cross-sectional view of the lower triple tree 19 taken along line 11-11 of FIG. 10A is shown in FIG. 11. The lower triple tree 19 includes two lower fork passages 16 which include gaps and may be tightened to clamp fork tubes of the forks 12 into the lower triple tree 19. The lower triple tree 19 further includes a lower steering shaft passage 62 for the separate of the fork passages 60 from the steering passage 62 is a first length L1.

Figures 12, 12A, 12B, 12C, 12D, 13:
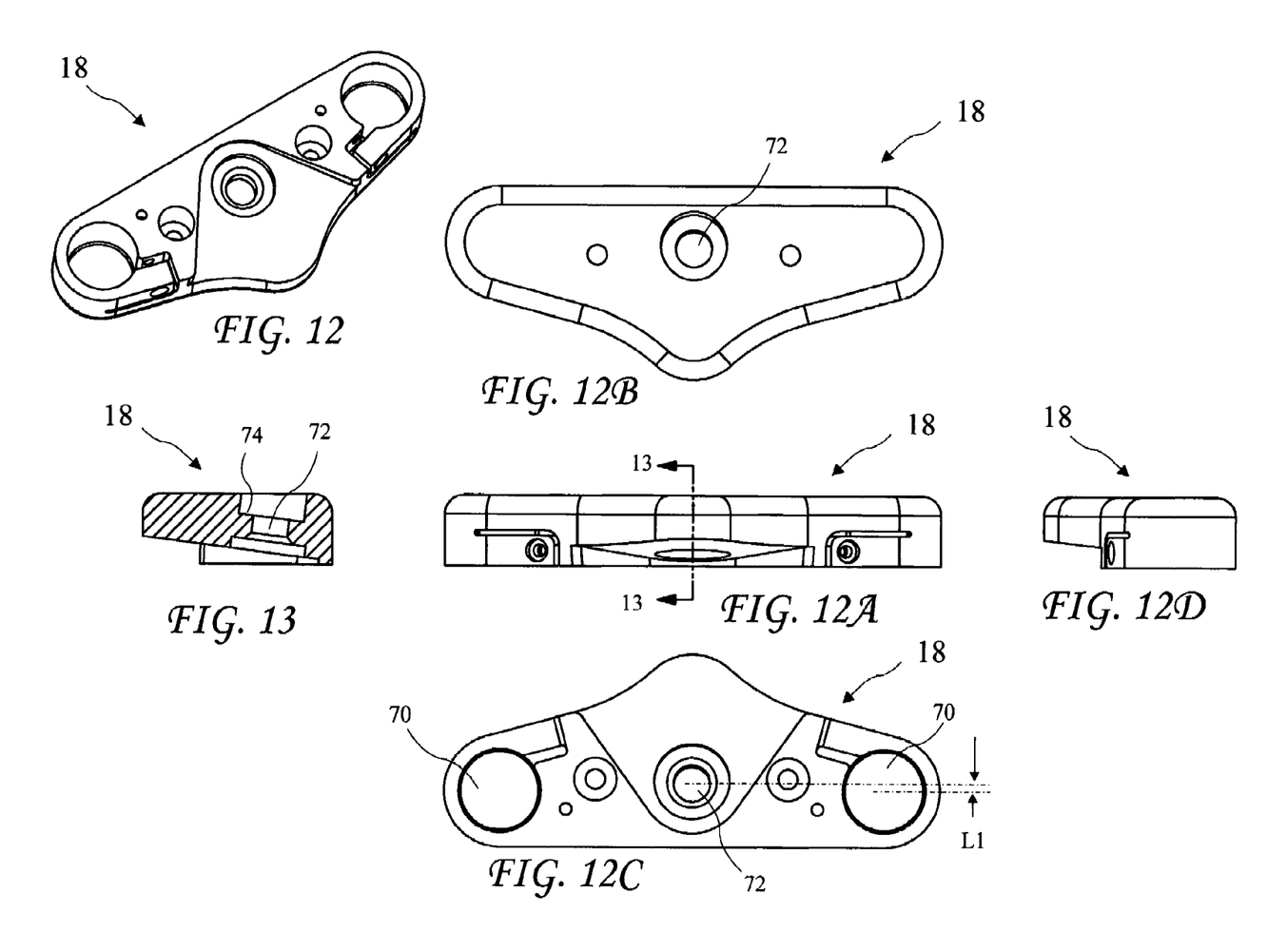
FIG. 12 is a bottom perspective view of an upper triple tree according to the present invention of the fork rake extender kit.
FIG. 12A is a rear view of the upper triple tree.
FIG. 12B is a top view of the upper triple tree.
FIG. 12C is a bottom view of the upper triple tree.
FIG. 12D is a side view of the upper triple tree.
FIG. 13 is a cross-sectional view of the upper triple tree taken along line 13-13 of FIG. 12A.

A bottom perspective view of the upper triple tree 18 according to the present invention is shown in FIG. 12, a rear view of the upper triple tree 18 is shown in FIG. 12A, a top view of the upper triple tree 18 is shown in FIG. 12B, a bottom view of the upper triple tree 18 is shown in FIG. 12C, and a side view of the upper triple tree 18 is shown in FIG. 12D. A cross-sectional view of the upper triple tree 18 taken along line 13-13 of FIG. 12A is shown in FIG. 13. The upper triple tree 18 includes two upper fork passages 70, and upper steering shaft passage 72. The separate of the upper fork passages 70 from the upper steering passage 62 is a second length L2. The length L1 (see FIG. 10B) is larger than the length L2, thereby increasing the fork rake.

While the invention herein disclosed has been described by means of specific embodiments and applications thereof, numerous modifications and variations could be made thereto by those skilled in the art without departing from the scope of the invention set forth in the claims.

I claim:

1. A motorcycle fork rake extender comprising:
    an upper adapter block having an upper steering head end and an upper triple tree end, the upper steering head end spaced apart from the upper triple tree end by an upper adapter spacing;
    a lower adapter block having a lower steering head end and a lower triple tree end, the lower triple tree end spaced apart from the lower steering head end by a lower adapter spacing which is greater than the upper adapter spacing;
    an adapter block fastener configured for passing through a steering head and connecting the lower steering head end of the lower adapter block to the upper steering head end of the upper adapter block;
    an upper steering bearing residing in the upper fork end of the upper adapter block;
    a lower steering bearing residing in the lower fork end of the lower adapter block;
    an upper triple tree rotatably connected to the upper adapter block through steering bearings; and
    a lower triple tree rotatably connected to the lower adapter block through steering bearings.

2. The rake extender of claim 1, wherein the adapter block fastener is a main assembly bolt connecting the adapter blocks and vertically squeezing the adapter blocks against steering head.

3. The rake extender of claim 2, wherein the main assembly bolt passes upwards through the lower adapter block and theadedly engages the upper adapter block to vertically squeeze the adapter blocks against steering head.

4. The rake extender of claim 1, further including a rear spacer configured to reside in the steering head, and wherein:
    the rear spacer includes spacer alignment features at each end;
    the lower adapter block includes a lower block alignment feature;
    the upper adapter block includes an upper block alignment feature; and
    the spacer resides between the upper adapter block and the lower adapter block and the spacer alignment features cooperate with the upper and lower block alignment features to rotationally align the adapter blocks.

5. The rake extender of claim 4, wherein the adapter blocks include cylindrical portions configured to reside in bearing seats in the steering head for positioning the adapter blocks, and the cylindrical portions include the block alignment features.

6. The rake extender of claim 4, wherein the block alignment features are rectangular notches in the cylindrical portions and the spacer alignment features are opposed rectangular blocks configured to engage the block alignment features.

7. The rake extender of claim 1, wherein the lower triple tree spaces fork tubes forward to increase fork rake.

8. The rake extender of claim 1, further including set screws for rotationally fixing the position of the lower adapter block with respect to the steering head.

9. The rake extender of claim 8, wherein the set screws are positioned to engage stop pads on a motorcycle frame.

10. A motorcycle fork rake extender kit comprising:
    an upper adapter block having an upper steering head end and an upper triple tree end, the upper steering head end spaced apart from the upper triple tree end by an upper adapter spacing;
    a lower adapter block having a lower steering head end and a lower triple tree end, the lower triple tree end spaced apart from the lower steering head end by a lower adapter spacing which is greater than the upper adapter spacing;
    a main assembly bolt configured for passing through a steering head and connecting the lower steering head end of the lower adapter block to the upper steering head end of the upper adapter block;
    an upper steering bearing residing in the upper fork end of the upper adapter block;
    a lower steering bearing residing in the lower fork end of the lower adapter block;
    an upper triple tree rotatably connected to the upper adapter block through the steering bearings; and
    a lower triple tree rotatably connected to the lower adapter block through the lower steering bearings and configured to space fork tubes forward to increase fork rake.

11. A motorcycle fork rake extender kit comprising:
    an upper adapter block having an upper steering head end and an upper triple tree end, the upper steering head end spaced apart from the upper triple tree end by an upper adapter spacing;
    a lower adapter block having a lower steering head end and a lower triple tree end, the lower triple tree end spaced apart from the lower steering head end by a lower adapter spacing which is greater than the upper adapter spacing;
    locking features attached to one of the group consisting of the upper adapter block and the lower adapter block for rotationally fixing the position of the adapter blocks with respect to the steering head;
    a main assembly bolt configured for passing through a steering head and connecting the lower steering head end of the lower adapter block to the upper steering head end of the upper adapter block;
    an upper steering bearing residing in the upper fork end of the upper adapter block;
    a lower steering bearing residing in the lower fork end of the lower adapter block;
    an upper triple tree rotatably connected to the upper adapter block through the steering bearings; and a lower triple tree rotatably connected to the lower adapter block through the lower steering bearings and configured to space fork tubes forward to increase fork rake.

12. The rake extender kit of claim 11, wherein the locking features comprise set screws.

13. The rake extender kit of claim 11, wherein the set screws cooperate with stop pads to rotationally fix the position of the adapter brackets with respect to the steering head.

* * * * *